(12) United States Patent
Lee et al.

(10) Patent No.: US 8,379,748 B2
(45) Date of Patent: Feb. 19, 2013

(54) APPARATUS AND METHOD FOR RECEPTION IN MULTI-INPUT MULTI-OUTPUT SYSTEM

(75) Inventors: Yu-Ro Lee, Daejeon (KR); Minho Cheong, Daejeon (KR); Jong-Eo Oh, Daejeon (KR); Jeevon Choi, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 569 days.

(21) Appl. No.: 12/633,919

(22) Filed: Dec. 9, 2009

(65) Prior Publication Data

US 2010/0150281 A1    Jun. 17, 2010

(30) Foreign Application Priority Data

Dec. 10, 2008 (KR) .................. 10-2008-0125152
Aug. 18, 2009 (KR) .................. 10-2009-0076174

(51) Int. Cl.
*H04L 1/20* (2006.01)
*H04B 7/02* (2006.01)

(52) U.S. Cl. ........ 375/267; 375/316; 375/347; 370/334; 455/101

(58) Field of Classification Search .................. 375/267, 375/316, 347; 370/334; 455/101
See application file for complete search history.

(56) References Cited

U.S. PATENT DOCUMENTS

| 7,746,951 | B2 * | 6/2010 | Hwang et al. | 375/267 |
| 8,045,652 | B1 * | 10/2011 | Bitran et al. | 375/341 |
| 2005/0265465 | A1 * | 12/2005 | Hosur et al. | 375/260 |
| 2007/0127589 | A1 | 6/2007 | Hwang et al. | |

FOREIGN PATENT DOCUMENTS

| KR | 10-2003-0013809 | 2/2003 |
| KR | 10-2006-0012825 | 2/2006 |
| KR | 10-2007-0052037 | 5/2007 |

OTHER PUBLICATIONS

"MMSE Extension of V-BLAST based on Sorted QR Decomposition," Dirk Wübben et al., Vehicular Technology Conference, 2003, VTC 2003-Fall, IEEE $58^{th}$, Oct. 6-9, 2003, vol. 1, pp. 508-512.

* cited by examiner

*Primary Examiner* — Ted Wang
(74) *Attorney, Agent, or Firm* — Staas & Halsey LLP (57) ABSTRACT

Provided are an apparatus and method for reception in a MIMO system. An apparatus for calculating a signal weight, includes: at least two multiplexers configured to receive, a data stream corresponding to a weight inputted and multiplex the received data stream prior to output; a multiplexing control unit configured to control the outputs of the respective multiplexers and provide a clock of a predetermined rate and a clock of a double rate two times higher than the predetermined rate; a first multiplier configured to receive multiplexed data outputted from the respective multiplexers and multiply the multiplexed data; a first storage unit configured to latch the multiplication result of the first multiplier by the double-rate clock prior to output; an adder configured to add the output of the first storage unit and the output of the first multiplier; and a second storage unit configured to latch the addition.

10 Claims, 7 Drawing Sheets

FIG. 6

APPARATUS AND METHOD FOR RECEPTION IN MULTI-INPUT MULTI-OUTPUT SYSTEM

CROSS-REFERENCE(S) TO RELATED APPLICATIONS

The present invention claims priority of Korean Patent Application Nos. 10-2008-0125152 and 10-2009-0076174, filed on Dec. 10, 2008 and Aug. 18, 2009, respectively, which are incorporated herein by reference in their entirety.

BACKGROUND OF THE INVENTION

1. Field of the Invention

The present invention relates to an apparatus and method for reception in a multi-input multi-output (MIMO) system; and, more particularly, to an apparatus and method for MIMO scheme using a plurality of transmission/reception (TX/RX) antennas in an orthogonal frequency division multiple access (OFDMA) system.

2. Description of Related Art

Recently, the weigh of data services is increasing in wireless communication systems, together with conventional voice services. In the data services, multimedia data based on a plurality of media are increasing in comparison with data based on a single medium. Also, the wireless communication systems are evolving into a broadband mode to transmit high-rate data. An orthogonal frequency division multiplex (OFDM) scheme is being used as a transmission scheme in a wireless communication system for transmission of high-rate broadband data. Also, a multi-input multi-output (MIMO) scheme, which transmits many data simultaneously by means of a plurality of TX/RX antennas, is being proposed to increase the frequency efficiency.

At present, the OFDM scheme is a modulation scheme that is most suitable for high-rate data transmission. The OFDM scheme can be regarded as a special mode of multi-carrier transmission, and transmits one data stream through a plurality of subcarriers, not through a single carrier.

In wireless communication environments, a delay spread occurs due to a multipath caused by obstacles such as buildings. When a delay spread time is longer than a transmission time of the next symbol, an inter-symbol interference (ISI) occurs. In this case, a frequency selective fading occurs in a frequency domain. In the case of using a single carrier, an equalizer is used to remove an inter-symbol interference. However, the complexity of an equalizer increases as the data rate increases.

In the OFDM scheme, high-rate data are transmitted in parallel by means of a plurality of subcarriers, thereby preventing a frequency selective fading of one carrier in each subcarrier. Also, in order to prevent an orthogonal component from being obscured due to an inter-symbol interference caused by a wave delayed during transmission, a guard interval is inserted to prevent the interference. The OFDM scheme is being used as the core technology for various fields such as 802.11 Wireless LAN, DMB (Digital Multimedia Broadcasting), PLC (Power Line Communication), xDSL, 4G mobile communication, and HPi (High-Speed Portable Internet).

The conventional wireless communication system provides voice-centered services, and uses channel coding to overcome the poorness of a channel. However, as a high-quality multimedia service capable of communication with everybody everywhere is required, the communication services evolve from voice-centered into data-centered. What is therefore required is a technique to transmit a large amount of data rapidly and errorlessly. However, a mobile communication environment may greatly distort signals due to multipath, shadow effects, propagation attenuation, and interference. In particular, fading due to multipath may cause a severe distortion by the sum of signals with different amplitudes and phases received through different paths. This fading is one of the limitations that must be overcome in high-rate digital communication systems. One of the methods proposed to solve the above limitation is an MIMO system.

The MIMO system is a development of a single-input single-output (SISO) system. The MIMO system uses a plurality of TX/RX antennas. Because the MIMO system transmits several signals simultaneously by several antennas, it can transmit more data without increasing the bandwidth, in comparison with the convention system.

However, the MIMO system is weak against frequency selective fading and inter-symbol interference that occur during high-rate transmission. In order to overcome the above limitation, an OFDM scheme is used together with the MIMO system. The OFDM system processes data in parallel, divides a high-rate data stream into low-rate data streams, and transmits the data streams simultaneously by means of a plurality of carriers. The use of low-rate parallel carriers increases a symbol interval, thus reducing the inter-symbol interference. Also, the OFDM system uses a guard interval, thereby removing the inter-symbol interference nearly completely. Also, because the OFDM system uses a plurality of carriers, it is robust against frequency selective fading. Consequently, a combination of the two systems can utilize the advantages of the MIMO system and can overcome the limitations by means of the OFDM system.

However, an OFDM receiver must calculate an LLR value in order to decode a signal. The LLR value calculation requires multipliers, thus increasing the complexity of a decoder. What is therefore required is a method for reducing the complexity of a hardware structure used to calculate an LLR value in a decoding operation of the receiver.

SUMMARY OF THE INVENTION

An embodiment of the present invention is directed to provide a receiving apparatus and method capable of reducing hardware complexity.

Another embodiment of the present invention is directed to provide a receiving apparatus and method capable of reducing the amount of computation.

Another embodiment of the present invention is directed to provide a receiving apparatus and method having high extendibility.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an apparatus for calculating a signal weight in a received (RX) signal decoding device in a wireless communication system using a multi-input multi-output (MIMO) system, the apparatus includes: at least two multiplexers configured to receive, corresponding to RX antennas, a data stream corresponding to a weight inputted corresponding to the number of transmission/reception (TX/RX) antennas and multiplex the received data stream prior to output; a multiplexing control unit configured to control the outputs of the respective multiplexers and provide a clock of a predetermined rate and a clock of a double rate two times higher than the predetermined rate; a first multiplier configured to receive multiplexed data outputted from the respective multiplexers and multiply the multiplexed data; a first storage unit configured to latch the multiplication result of the first multiplier by the double-rate clock prior to output; an adder configured to add the output of the first storage unit and the output of the first multiplier; and a second storage unit configured to latch the addition result by the clock prior to output.

In accordance with an aspect of the present invention, there is provided a method for calculating a signal weight in a received (RX) signal decoding device in a wireless communication system using a multi-input multi-output (MIMO) system, the method includes: multiplexing, corresponding to RX antennas, a data stream corresponding to a weight inputted corresponding to the number of transmission/reception (TX/RX) antennas; multiplying the multiplexed data; latching the multiplication result by a double-rate clock two time higher than a predetermined rate prior to output; adding the multiplication result value and the latched value; and latching the addition result by the clock prior to output.

In accordance with an aspect of the present invention, there is provided an apparatus for calculating a log likelihood ratio (LLR) inputted from a linear receiver into a decoder in a wireless communication system using a multi-input multi-output (MIMO) scheme, the apparatus includes: an MIMO receiver configured to output MIMO signals, which are inputted respectively from transmission (TX) antennas into reception (RX) antennas, in such a way to divide the MIMO signals into imaginary components and real components on an RX antenna basis; a first multiplexer configured to select a predetermined normalization value corresponding to each modulation scheme; a first multiplier configured to multiply each of the output signals of the MIMO receiver by the normalization value of the first multiplexer; and an LLR extractor configured to calculate an LLR value for each of the outputs of the first multiplier by using a normalization value of a constellation corresponding to the modulation scheme of a received signal.

In accordance with an aspect of the present invention, there is provided a method for calculating a log likelihood ratio (LLR) inputted from a linear receiver into a decoder in a wireless communication system using a multi-input multi-output (MIMO) scheme, the method includes: outputting MIMO signals, which are inputted respectively from transmission (TX) antennas into reception (RX) antennas, in such a way to divide the MIMO signals into imaginary components and real components on an RX antenna basis; multiplying each of the output signals divided into the imaginary and real components by a predetermined normalization value corresponding to each modulation scheme; and calculating an LLR value for each of the multiplication result values by using a normalization value of a constellation corresponding to the modulation scheme of a received signal.

DESCRIPTION OF SPECIFIC EMBODIMENTS

The advantages, features and aspects of the invention will become apparent from the following description of the embodiments with reference to the accompanying drawings, which is set forth hereinafter.

In describing the present invention, detailed descriptions of well-known functions or configurations will be omitted in order not to unnecessarily obscure the subject matters of the present invention.

Hereinafter, a description will be given of a combination of a general MIMO system and an OFDM scheme. The MIMO system includes N transmission (TX) antennas and N reception (RX) antennas. An MIMO-OFDM system is a combination of the MIMO system and an OFDM scheme.

Figure 1:
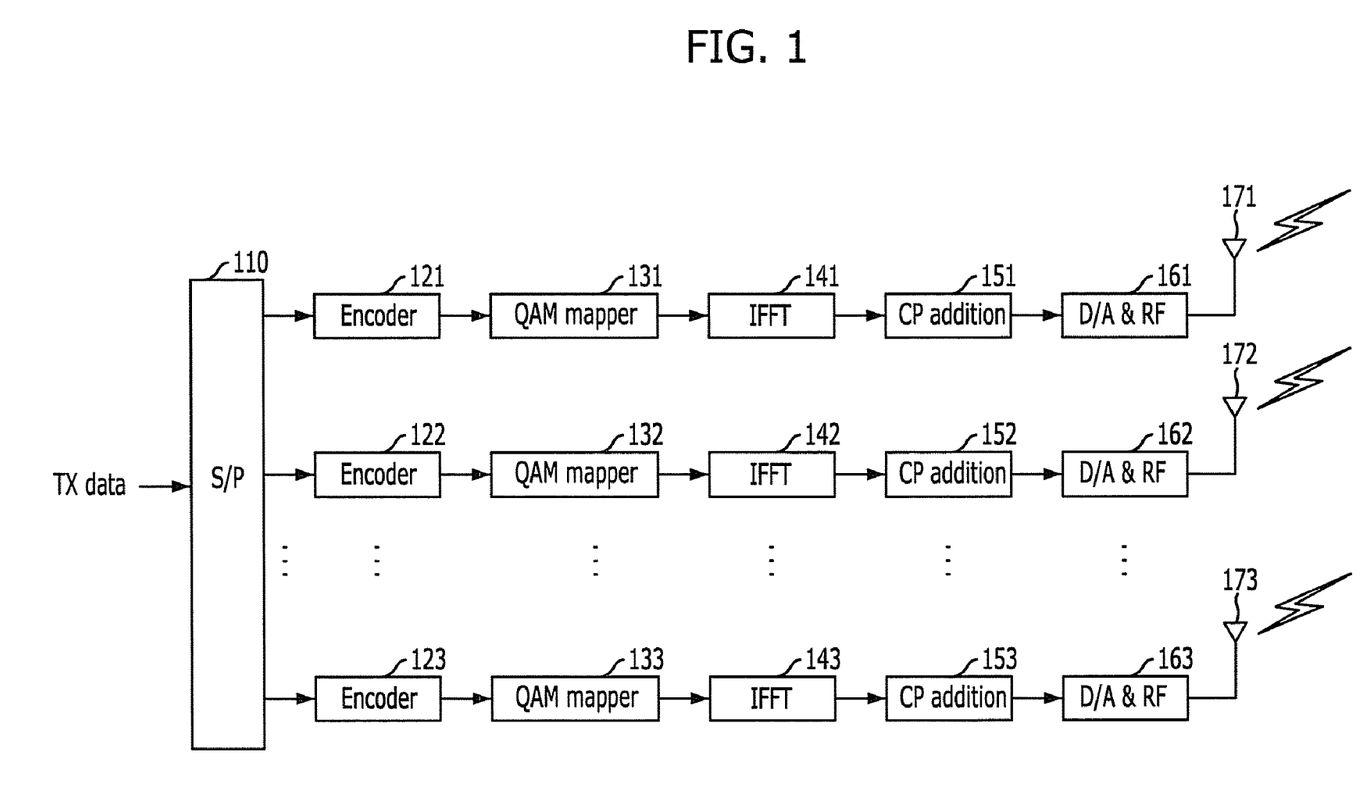
FIG. 1 is a block diagram of an OFDM-MIMO transmitter.

FIG. 1 is a block diagram of a transmitter in an OFDM-MIMO system.

Referring to FIG. 1, a transmitter of an OFDM-MIMO system includes a serial-to-parallel (S/P) converter 110, encoders 121 to 123, quadrature amplitude modulation (QAM) mappers 131 to 133, inverse fast Fourier Transformers (IFFTs) 141 to 143, cyclic prefix (CP) adders 151 to 153, digital-to-analog (D/A) conversion and radio frequency (RF) units 161 to 163, and TX antennas 171 to 173. In the configuration of FIG. 1, a plurality of TX antennas are used to perform MIMO-based transmission. Also, the number of the encoders, the number of the QAM mappers, the number of the IFFTs, the number of the CP adders, and the number of the D/A conversion and RF units are the same as the number of the TX antennas.

Hereinafter, a transmitter operation based on an OFDM-MIMO scheme will be described with reference to FIG. 1. In order to receive TX data and transfer the TX data to a plurality of antennas, the S/P converter 110 divides a serial data stream into a plurality of data streams and transfers the data streams respectively to the encoders 121 to 123. The encoders 121 to 123 encode the data streams, received respectively from the S/P converters, and transfer the results respectively to the QAM mappers 131 to 133. The QAM mappers 131 to 133 modulate the data, received respectively from the encoders 121 to 123, according to a modulation scheme and transfer the results respectively to the IFFTs 141 to 143. For example, the modulation scheme may be a general modulation scheme such as binary phase shift keying (BPSK), quadrature phase shift keying (QPSK), 16 QAM, and 64 QAM. The IFFTs 141 to 143 transform the modulated data, received respectively from the QAM mappers 131 to 133, into time-domain signals and transfer the time-domain signals respectively to the CP adders 151 to 153. The CP adders 151 to 153 add a cyclic prefix to the symbols of the time-domain signals, received respectively from the IFFTs 141 to 143, and transfer the results respectively to the D/A conversion and RF units 161 to 163. The D/A conversion and RF units 161 to 163 convert the CP-added digital signals, received respectively from the D/A conversion and RF units 161 to 163, into analog signals by the D/A conversion units, convert the analog signals into RF signals by the RF units, and transfers the RF signals respectively to the TX antennas 171 to 173. The TX antennas 171 to 173 transmit the signals, received respectively from the D/A conversion and RF units 161 to 163, to a receiver through a radio medium.

Figure 2:
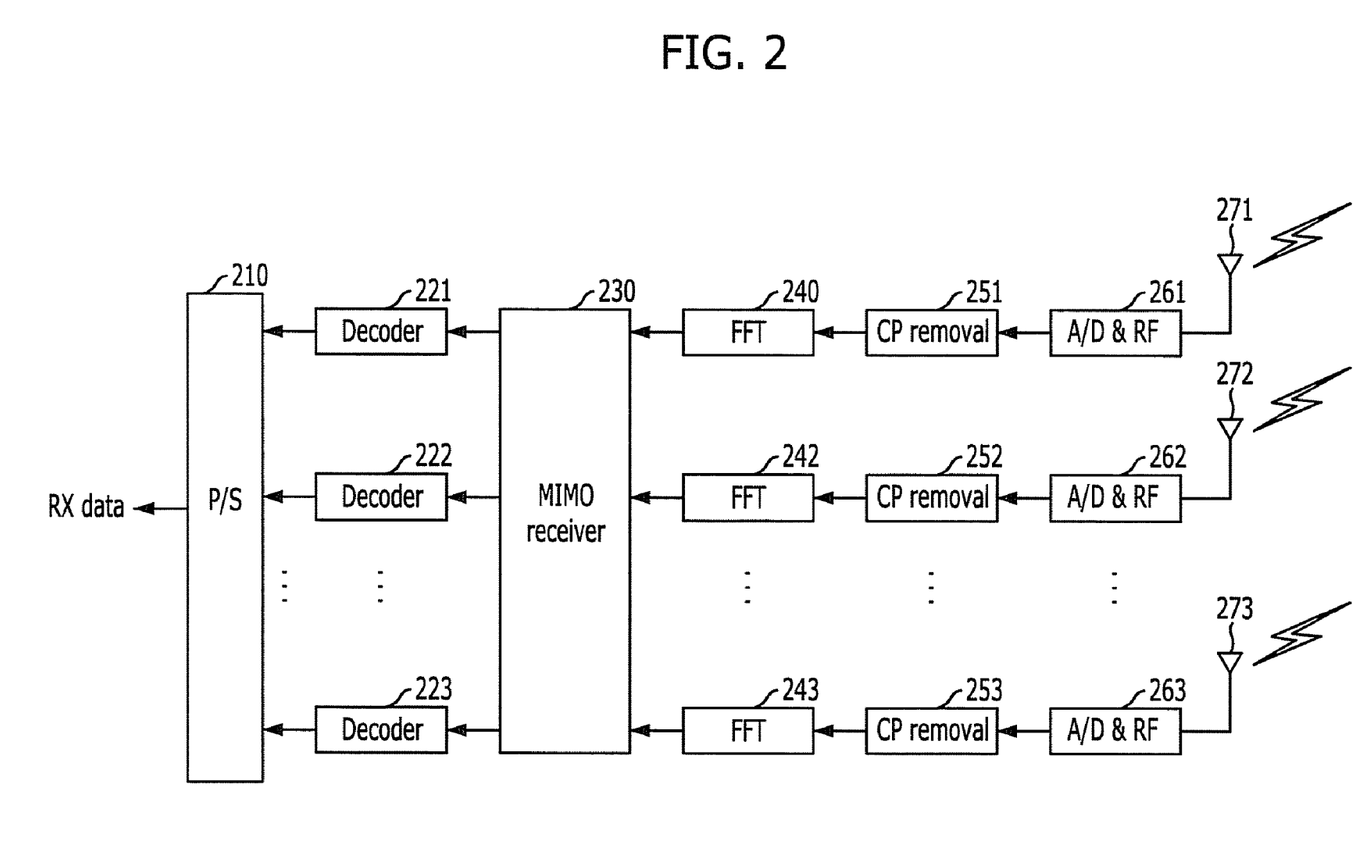
FIG. 2 is a block diagram of an OFDM-MIMO receiver.

Hereinafter, a description will be given of an OFDM-MIMO receiver. FIG. 2 is a block diagram of a receiver in an OFDM-MIMO system.

Referring to FIG. 2, a receiver of an OFDM-MIMO system includes a parallel-to-serial (P/S) converter 210, decoders 221 to 223, an MIMO receiver 230, fast Fourier transformers (FFTs) 241 to 243, cyclic prefix (CP) removers 251 to 253, analog-to-digital (A/D) conversion and radio frequency (RF) units 261 to 263, and RX antennas 271 to 273. In the configuration of FIG. 2, a plurality of RX antennas are used to perform MIMO-based reception. Also, the number of the decoders, the number of the FFTs, the number of the CP removers, and the number of the A/D conversion and RF units are the same as the number of the RX antennas.

Hereinafter, a receiver operation based on an OFDM-MIMO scheme will be described with reference to FIG. 2. The RX antennas 271 to 273 receive data transmitted from a transmitter, and transfer the received data respectively to the A/D conversion and RF units 261 to 263. The A/D conversion and RF units 261 to 263 down-convert the received signals into analog signals, convert the analog signals into digital signals, and provide the digital signals respectively to the CP removers 251 to 253. The CP removers 251 to 253 remove cyclic prefixes (CPs) from the signals received from the A/D conversion and RF units 261 to 263, and transfer the results respectively to the FFTs 241 to 243. The FFTs 241 and 243 transform the CP-removed signals, received from the CP removers 251 to 253, into frequency-domain signals and transfer the frequency-domain signals to the MIMO receiver 230. The MIMO receiver 230 estimates the data symbol received from the FFTs 241 to 243, calculates a log likelihood ratio (LLR) from the estimated symbol, and transfers the calculated LLR to the decoders 221 to 223. The decoders 221 to 223 decode the signals received from the MIMO receiver 230 and transfer the resulting data stream to the P/S converter 210. The P/S converter 210 converts the parallel data, received from the decoders 221 to 223, into serial data.

Figure 3A:
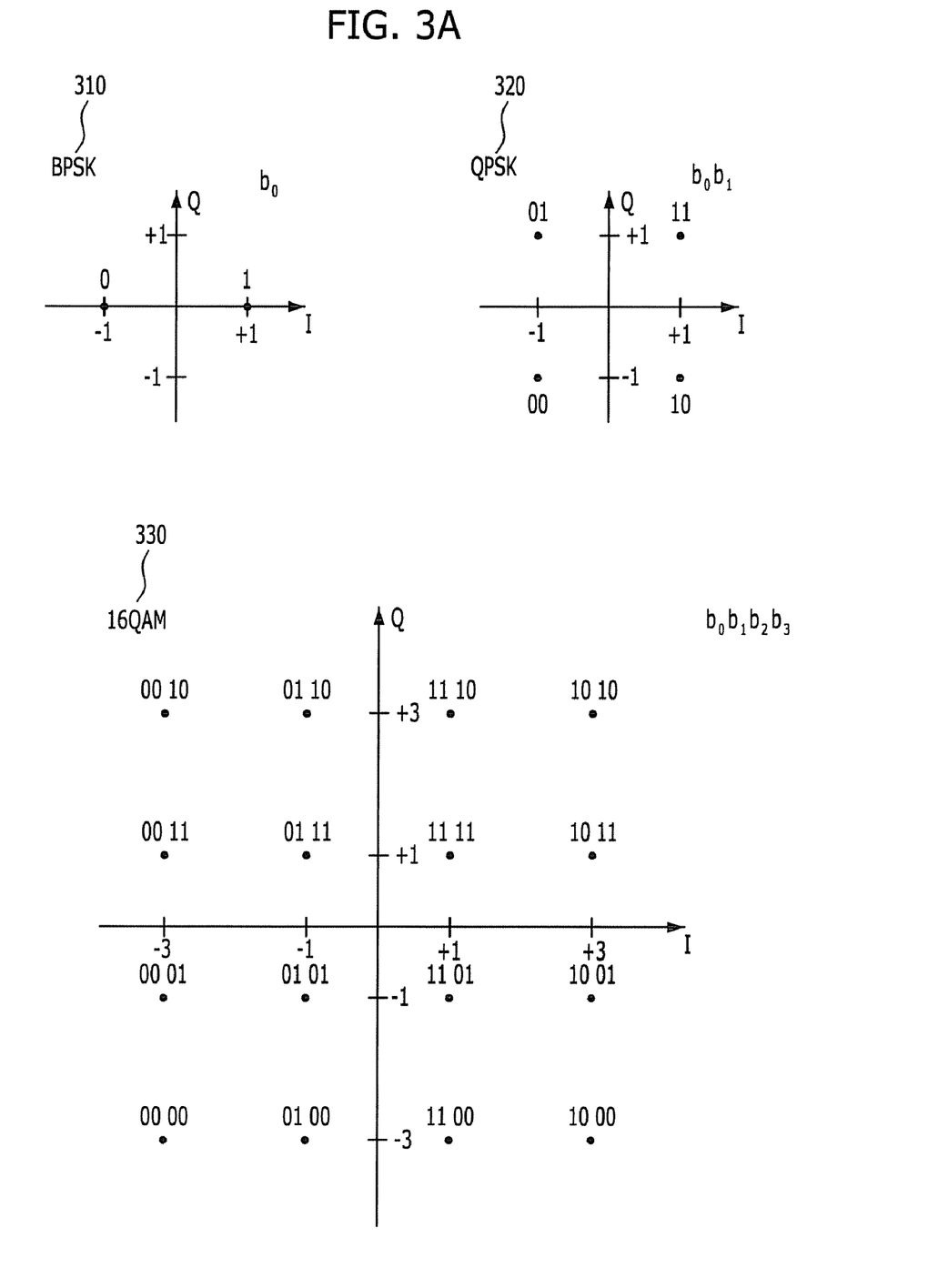
FIGS. 3A and 3B are constellation diagrams of modulation schemes of a general wireless communication system.
Figure 3B:
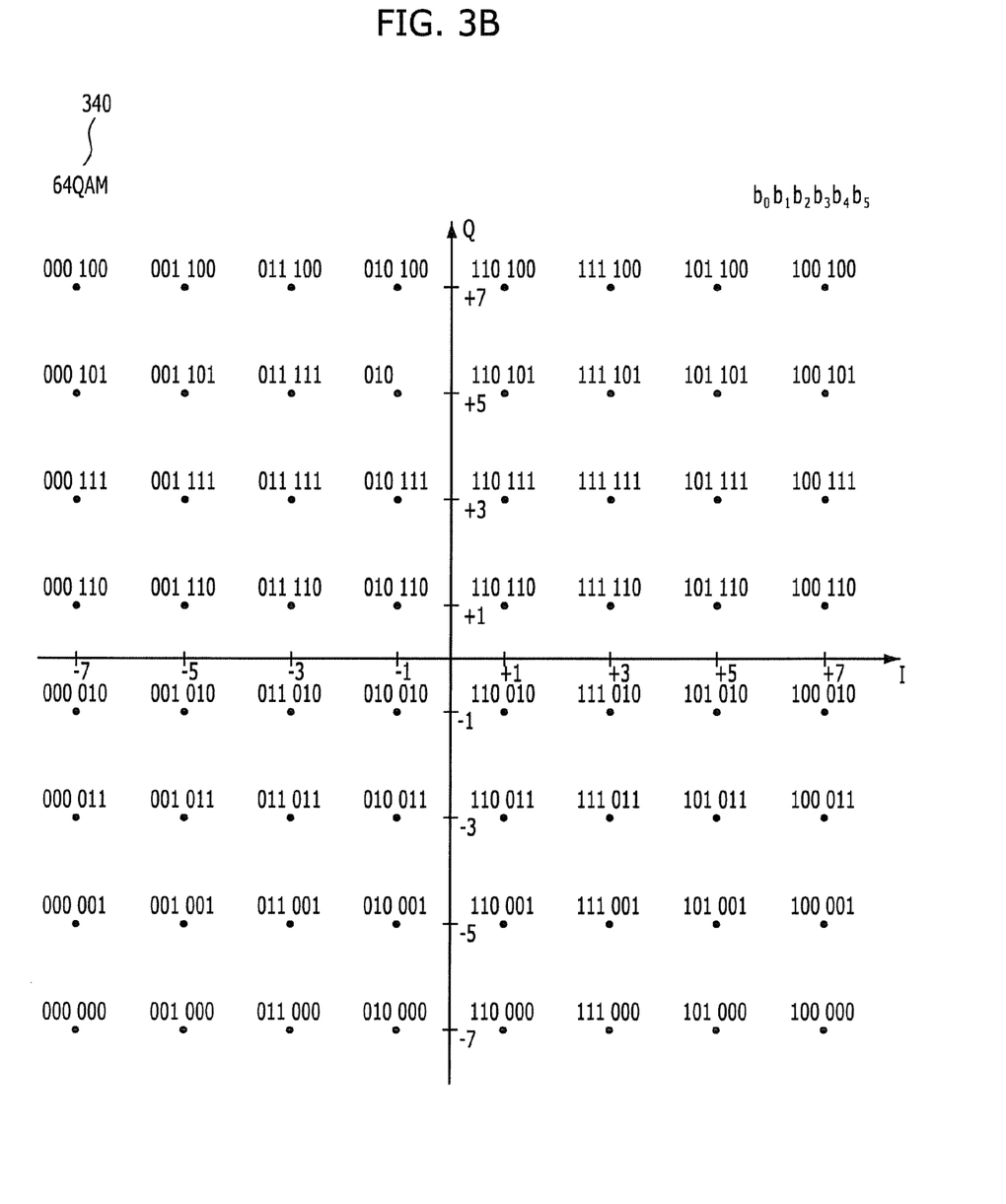

FIGS. 3A and 3B are respectively constellation diagrams of modulation schemes of a general wireless communication system.

FIG. 3A is a constellation diagram of each of BPSK, QPSK and 16 QAM modulation schemes. FIG. 3B is a constellation diagram of a 64 QAM modulation scheme.

A BPSK scheme 310 transmits one bit b0 at a time by using two constellation points that have a phase difference of 180° therebetween. A QPSK scheme 320 transmits 2 bits b0b1 at a time by using four constellation points that have a phase difference of 90° therebetween. A QAM scheme transmits a plurality of bits at a time by changing amplitude and phase and performing a mapping operation. For example, a 16 QAM scheme 330 generates 16 constellation points by changing amplitude and phase, and transmits four bits b0b1b2b3 at a time. A 64 QAM 340 transmits 6 bits b0b1b2b3b4b5 at a time.

Hereinafter, an operation of an MIMO receiver will be described in detail by using equations. As the number of TX/RX antennas increases, the complexity of the MIMO receiver increases greatly, particularly the complexity of QR decomposition.

If the number of TX antennas is M and the number of RX antennas is N, an RX vector z in a subcarrier after an FFT operation can be expressed as Equation (1).

$$z = Hs + n \quad (1)$$

where an RX vector $$Z = \begin{bmatrix} z_0 \\ z_1 \\ \vdots \\ z_{N-1} \end{bmatrix},$$

a channel $$H = \begin{bmatrix} h_{0,0} & h_{0,1} & \cdots & h_{0,M-1} \\ h_{1,0} & h_{1,1} & \cdots & h_{1,M-1} \\ \vdots & \vdots & \ddots & \vdots \\ h_{N-1,0} & h_{N-1,1} & \cdots & h_{N-1,M-1} \end{bmatrix},$$

a TX symbol $$S = \begin{bmatrix} s_0 \\ s_1 \\ \vdots \\ s_{M-1} \end{bmatrix},$$

a symbol is comprised of 2 bits ($s_i = x_{i,0}, x_{i,1}$) for QPSK, 4 bits ($s_i = x_{i,0}, x_{i,1}, x_{i,2}, x_{i,3}$) for 16 QAM, and 6 bits ($s_i = x_{i,0}, x_{i,1}, x_{i,2}, x_{i,3}, x_{i,4}, x_{i,5}$) for 64 QAM, and 'n' denotes a white Gaussian noise.

A normalization value causing the average power of a constellation of each modulation scheme to be '1' is shown in Table 1.

TABLE 1

| QPSK | $1/\sqrt{2}$ |
|---|---|
| 16QAM | $1/\sqrt{10}$ |
| 64QAM | $1/\sqrt{42}$ |

Examples of the MIMO reception scheme include ML, sphere detection, and BLAST. Among them, the schemes of a linear receiver are divided into ZF (Zero Forcing) and MMSE (Minimum Mean Square Error) according to the decomposition scheme of an RX signal vector. The ZF has a limitation of noise amplification. The MMSE can prevent noise amplification but has a difficulty in providing complete signal decomposition.

If the receiver has a weight of w, an RX vector ŝ with a weight can be expressed as Equation (2).

$$\hat{s} = wz = wHs + wn \quad (2)$$

Also, in the case of a ZF receiver, a weight w can be expressed as Equation (3), and in the case of an MMSE receiver, a weight w can be expressed as Equation (4).

$$w = (H^H H)^{-1} H^H \quad (3)$$

$$w = (H^H H + I(\sigma^2/S))^{-1} H^H \quad (4)$$

where $\sigma^2$ denotes the noise variance of n' and S denotes the symbol power.

An inverse matrix used to calculate the weight can be calculated by various methods, and it is comprised of many multiplication operations. For example, if an inverse matrix is calculated using a QR decomposition method, the number of TX antennas is M, and the number of RX antennas is N, H of a channel N×M is comprised of an N×M unitary matrix Q and an M×M upper triangular matrix R and can be expressed as H=QR. Likewise, because multiplication of $Q^H$ results in $Q^H H = Q^H QR$ and $Q^H Q = 1$ (unitary matrix), a matrix R can be expressed as Equation (5).

$$R = Q^H H = \begin{bmatrix} r_{0,0} & r_{0,1} & \cdots & r_{0,M-1} \\ 0 & r_{1,1} & \cdots & r_{1,M-1} \\ 0 & \vdots & \ddots & \vdots \\ 0 & \cdots & 0 & r_{M-1,M-1} \end{bmatrix} \quad (5)$$

Also, an RX vector y can be expressed as Equation (6).

$$y = \begin{bmatrix} y_0 \\ y_1 \\ \vdots \\ y_{M-1} \end{bmatrix} \quad (6)$$

$$= Q^H z$$

$$= Rs + n'$$

-continued $$= \begin{bmatrix} r_{0,0} & r_{0,1} & \cdots & r_{0,M-1} \\ 0 & r_{1,1} & \cdots & r_{1,M-1} \\ 0 & \vdots & \ddots & \vdots \\ 0 & \cdots & 0 & r_{M-1,M-1} \end{bmatrix} \begin{bmatrix} s_0 \\ s_1 \\ \vdots \\ s_{M-1} \end{bmatrix} + \begin{bmatrix} n'_0 \\ n'_1 \\ \vdots \\ n'_{M-1} \end{bmatrix}$$

Herein, the weight w varies depending on the vector decomposition scheme of a received signal. For example, in the case of a ZF receiver, $w=R^{-1}$, and in the case of an MMSE receiver, $w=(R+I(\sigma_2/S))^{-1}$. If the weight w is $$w = \begin{bmatrix} w_{0,0} & w_{0,1} & w_{0,2} & w_{0,3} & \cdots & w_{0,M-1} \\ 0 & w_{1,1} & w_{1,2} & w_{1,2} & \cdots & w_{1,M-1} \\ 0 & 0 & w_{2,2} & w_{2,3} & \cdots & w_{2,M-1} \\ 0 & 0 & 0 & w_{3,3} & \cdots & w_{3,M-1} \\ 0 & 0 & 0 & 0 & \ddots & \vdots \\ 0 & 0 & 0 & 0 & 0 & w_{M-1,M-1} \end{bmatrix}$$

then
w = 0
for i = 0 to M-1
  $w_{i,j} = 1/r_{i,j}$
  for j = i + 1 to M-1

$$w_{i,j} = -\sum_{k=i}^{j-1} w_{i,k} r_{k,j}/r_{j,j}$$

end
end

In the number M of TX antennas is large, the number of multiplication operations for calculation of a weight w increase, thus increasing the hardware complexity. Also, a signal v outputted from a linear receiver can be expressed as Equation (7) in the form of a received signal y with a weight.

$$v = wRs + Wn' \tag{7}$$

Also, a log likelihood ration (i.e., a probability value of bits of 0 and 1) must be inputted so that the signal v outputted from the linear receiver is inputted into the decoder. This value can be expressed as Equation (8).

$$LLR(x_{n,k}) = \log\left(\frac{\sum_{\tilde{s}_n \in S_{n,k}^{+1}} \exp(-\|v_n - \tilde{s}_n\|^2/\sigma^2)}{\sum_{\tilde{s}_n \in S_{n,k}^{-1}} \exp(-\|v_n - \tilde{s}_n\|^2/\sigma^2)}\right) \tag{8}$$

where $S_{n,k}^{+1}$, $S_{n,k}^{-1}$ are respectively a signal subset of 0 and 1 constituting the $k^{th}$ bits of the $n^{th}$ TX antenna.

This LLR value can be approximated by log-sum as Equation 99).

$$LLR(x_{n,k}) = \tag{9}$$
$$\max_{\tilde{s}_n \in S_{n,k}^{+1}} \{-\|v_n - \tilde{s}_n\|^2/\sigma^2\} - \max_{\tilde{s}_n \in S_{n,k}^{-1}} \{-\|v_n - \tilde{s}_n\|^2/\sigma^2\}$$

If the LLR value is calculated using multipliers as described above, the complexity increases.

Thus, in order to overcome the above limitation, the present invention uses a scheme of sharing a multiplier. Hereinafter, the scheme of the present invention will be described in detail.

Figure 4:
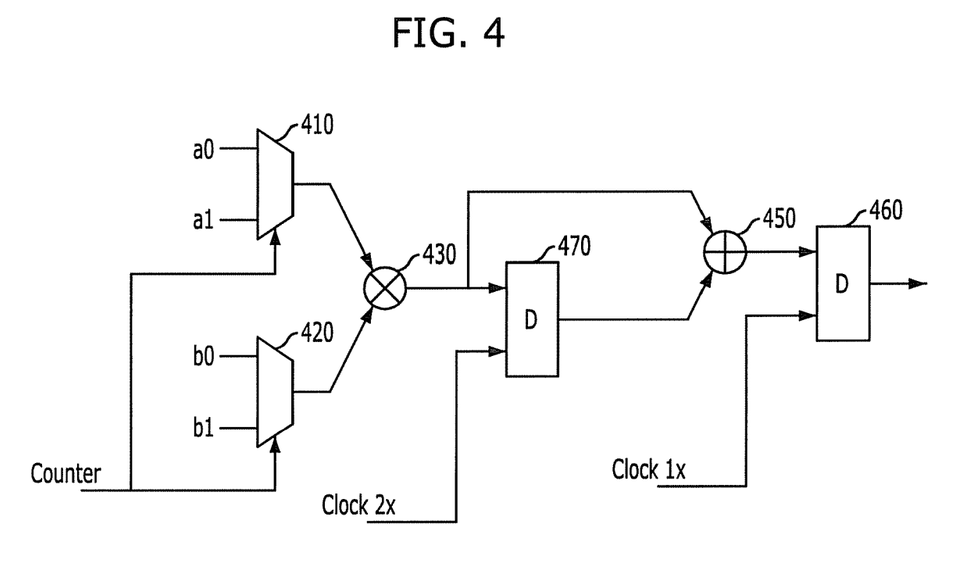
FIG. 4 is a diagram illustrating the structure of an operator sharing a multiplier.

FIG. 4 is a diagram illustrating the structure of an operator sharing a multiplier.

Referring to FIG. 4, the operation sharing a multiplier includes a first multiplexer 410, a second multiplexer 420, a multiplier 430, a first storage unit 440, an adder 450, and a second storage unit 460.

A great number of multipliers are necessary to calculate an inverse matrix for calculating a weight. An operation such as $$w_{i,j} = -\sum_{k=i}^{j-1} w_{i,k} r_{k,j}/r_{j,j}$$

is present in the inverse matrix calculation process described above. As can be seen from the above process, it is comprised of a combination of operations of c=(a0×b0)+(a1×b1). In order to reduce the hardware complexity, a multiplier of FIG. 4 is shared to reduce the number of necessary multipliers from 2 to 1. That is, a counter of 0 and 1 is used to control the first multiplexer 410 and the second multiplexer 410, and the outputs of the controlled first multiplexer 410 and the second multiplexer 420 are multiplied by the multiplier 430. In this manner, one multiplier is used to perform two multiplication operations. For example, when a counter signal '0' is inputted, a0 is selected by the first multiplexer 410 and b0 is selected by the second multiplexer 420. The selected a0 and b0 are transferred to and multiplied by the multiplier 430. Also, when a counter signal '1' is inputted, a1 is selected by the first multiplexer 410 and b1 is selected by the second multiplexer 420. The selected a1 and b1 are transferred to and multiplied by the multiplier 430.

In order to perform two multiplication operations by means of one multiplier, a 1-bit counter operating at a double clock rate two times higher than a predetermined reference clock rate is used to control the first multiplexer and the second multiplexer, the outputs of the first multiplexer and the second multiplexer are multiplied by the multiplier, and the multiplication result is stored in the first storage unit. Thereafter, the multiplication result stored in the first storage unit is generated at the next clock, it is added to the signal outputted from the multiplier 430, and the addition result is stored in a buffer operating at a 1× clock rate.

Also, in order to calculate the LLR of a signal r outputted from the linear receiver, an operation of Equation (9) and many multiplication operations are necessary. In order to reduce the above multiplication operations, a scaling operation is performed on the result of Equation (4), which can be expressed as Equation (10). Three modulation schemes QPSK, 16 QAM and 64 QAM are exemplified in the following description.

$$r = Cv = C(wRs + wn') \tag{10}$$

where C is a scaling value for each modulation scheme.

The present invention uses a scaling value of Equation (11) to reduce the computational complexity.

$$C = \begin{cases} C_{QPSK} = \dfrac{0.5}{1/\sqrt{2}} \\ C_{16QAM} = \dfrac{0.5}{2/\sqrt{10}} \\ C_{64QAM} = \dfrac{0.5}{2/\sqrt{42}} \end{cases} \tag{11}$$

A constellation point of a signal estimated by scaling with the value of Equation (11) can be expressed as Equation (12). When it is scaled with the value of Equation (11), a constellation point comprised of a real component and an imaginary component is generated. In the case of QPSK, four constellation points comprised of a real component $$\left(-\frac{1}{2}, \frac{1}{2}\right)$$

and an imaginary component $$\left(-\frac{1}{2}, \frac{1}{2}\right)$$

is generated are generated. That is, four constellation points of $$\left(-\frac{1}{2}, -\frac{1}{2}\right),$$

$$\left(-\frac{1}{2}, \frac{1}{2}\right),$$

$$\left(\frac{1}{2}, -\frac{1}{2}\right),$$

$$\left(\frac{1}{2}, \frac{1}{2}\right)$$

are generated. Likewise, in the case of 16 QAM, a reference value of a real component and an image component is used to generate 16 constellation points. Also, in the case of 64 QAM, a reference value of a real component and an image component is used to generate 64 constellation points.

$$s_i = \begin{cases} \left(\frac{1}{2}, -\frac{1}{2}\right) + j\left(-\frac{1}{2}, \frac{1}{2}\right), & \text{for QPSK} \\ \left(-\frac{3}{4}, -\frac{1}{4}, \frac{1}{4}, -\frac{3}{4}\right) + j\left(-\frac{3}{4}, -\frac{1}{4}, \frac{1}{4}, \frac{3}{4}\right), & \text{for } 16QAM \\ \left(-\frac{7}{8}, -\frac{5}{8}, -\frac{3}{8}, -\frac{1}{8}, \frac{7}{8}, \frac{5}{8}, \frac{3}{8}, \frac{1}{8}\right) + \\ j\left(-\frac{7}{8}, -\frac{5}{8}, -\frac{3}{8}, -\frac{1}{8}, \frac{7}{8}, \frac{5}{8}, \frac{3}{8}, \frac{1}{8}\right), & \text{for } 64QAM \end{cases}$$ (12)

In order to simplify the constellation operation of FIG. 3, a normalization value can be expressed as Table 2 on the basis of Equation (12).

TABLE 2

| Modulation Scheme | Scaling Value for Normalization |
|---|---|
| QPSK | ½ |
| 16QAM | ¼ |
| 64QAM | ⅛ |

An RX signal r passing the normalization value of Table 2 is comprised of a real component $r_i^{re}$ and an imaginary component $r_i^{im}$. If RX signal r is $$r = \begin{bmatrix} r_0^{re} + jr_0^{im} \\ r_1^{re} + jr_1^{im} \\ \vdots \\ r_{M-1}^{re} + jr_{M-1}^{im} \end{bmatrix}$$

then an LLR value of the $i^{th}$ TX antenna for transmitted by QPSK modulation is calculated as Equation (13).

$$LLR(x_{i,0}) = \begin{cases} \left(r_i^{re} + \frac{1}{2}\right)^2 - \left(r_i^{re} - \frac{1}{2}\right)^2 = 2r_i^{re}, & \text{for } r_i^{re} \geq 0 \\ \left(r_i^{re} + \frac{1}{2}\right)^2 - \left(r_i^{re} - \frac{1}{2}\right)^2 = 2r_i^{re}, & \text{for } r_i^{re} < 0 \end{cases}$$ (13)

$$LLR(x_{i,1}) = \begin{cases} \left(r_i^{im} + \frac{1}{2}\right)^2 - \left(r_i^{im} - \frac{1}{2}\right)^2 = 2r_i^{im}, & \text{for } r_i^{im} \geq 0 \\ \left(r_i^{im} + \frac{1}{2}\right)^2 - \left(r_i^{im} - \frac{1}{2}\right)^2 = 2r_i^{im}, & \text{for } r_i^{im} < 0 \end{cases}$$

An LLR value of the first two bits of the $i^{th}$ TX antenna for transmitted by 16 QAM modulation is calculated as Equation (14).

$$LLR(x_{i,0}) =$$ (14)

$$\begin{cases} \left(r_i^{re} + \frac{1}{4}\right)^2 - \left(r_i^{re} - \frac{3}{4}\right)^2 = (4r_i^{re} - 1)/2, & \text{for } r_i^{re} \geq 1/2 \\ \left(r_i^{re} + \frac{1}{4}\right)^2 - \left(r_i^{re} - \frac{1}{4}\right)^2 = r_i^{re}, & \text{for } 0 < r_i^{re} \leq 1/2 \\ \left(r_i^{re} + \frac{1}{4}\right)^2 - \left(r_i^{re} - \frac{1}{4}\right)^2 = r_i^{re}, & \text{for } -1/2 < r_i^{re} \leq 0 \\ \left(r_i^{re} + \frac{1}{4}\right)^2 - \left(r_i^{re} - \frac{3}{4}\right)^2 = (4r_i^{re} - 1)/2 & \text{for } r_i^{re} \leq -1/2 \end{cases}$$

$$LLR(x_{i,1}) =$$

$$\begin{cases} \left(r_i^{re} - \frac{3}{4}\right)^2 - \left(r_i^{re} - \frac{1}{4}\right)^2 = (2r_i^{re} - 1)/2, & \text{for } r_i^{re} \geq 1/2 \\ \left(r_i^{re} - \frac{3}{4}\right)^2 - \left(r_i^{re} - \frac{1}{4}\right)^2 = (2r_i^{re} - 1)/2, & \text{for } 0 < r_i^{re} \leq 1/2 \\ \left(r_i^{re} + \frac{3}{4}\right)^2 - \left(r_i^{re} + \frac{1}{4}\right)^2 = (2r_i^{re} + 1)/2, & \text{for } -1/2 < r_i^{re} \leq 0 \\ \left(r_i^{re} + \frac{3}{4}\right)^2 - \left(r_i^{re} + \frac{1}{4}\right)^2 = (2r_i^{re} + 1)/2, & \text{for } r_i^{re} \leq -1/2 \end{cases}$$

$LLR(x_{i,2})$ can be calculated in the same way as $LLR(x_{i,0})$ and $LLR(x_{i,3})$ can be calculated in the same way as $LLR(x_{i,1})$, wherein an input value $r_i^{re}$ is replaced by $r_i^{im}$.

An LLR value of the first three bits of the $i^{th}$ TX antenna for transmitted by 64 QAM modulation is calculated as Equation (15).

$LLR(x_{i,0}) =$ (15)

$$\begin{cases} \left(r_i^{re}+\frac{1}{8}\right)^2 - \left(r_i^{re}-\frac{7}{8}\right)^2 = (16r_i^{re}-6)/8, & \text{for } r_i^{re} \geq \frac{3}{4} \\ \left(r_i^{re}+\frac{1}{8}\right)^2 - \left(r_i^{re}-\frac{5}{8}\right)^2 = (12r_i^{re}-3)/8, & \text{for } \frac{2}{4} \leq r_i^{re} < \frac{3}{4} \\ \left(r_i^{re}+\frac{1}{8}\right)^2 - \left(r_i^{re}-\frac{3}{8}\right)^2 = (8r_i^{re}-1)/8, & \text{for } \frac{1}{4} \leq r_i^{re} < \frac{2}{4} \\ \left(r_i^{re}+\frac{1}{8}\right)^2 - \left(r_i^{re}-\frac{1}{8}\right)^2 = (4r_i^{re})/8, & \text{for } 0 \leq r_i^{re} < \frac{1}{4} \\ \left(r_i^{re}-\frac{1}{8}\right)^2 - \left(r_i^{re}+\frac{1}{8}\right)^2 = (4r_i^{re})/8, & \text{for } -\frac{1}{4} \leq r_i^{re} < 0 \\ \left(r_i^{re}-\frac{1}{8}\right)^2 - \left(r_i^{re}+\frac{3}{8}\right)^2 = (8r_i^{re}-1)/8, & \text{for } -\frac{2}{4} \leq r_i^{re} < -\frac{1}{4} \\ \left(r_i^{re}-\frac{1}{8}\right)^2 - \left(r_i^{re}+\frac{5}{8}\right)^2 = (12r_i^{re}-3)/8, & \text{for } -\frac{3}{4} \leq r_i^{re} < -\frac{2}{4} \\ \left(r_i^{re}-\frac{1}{8}\right)^2 - \left(r_i^{re}+\frac{7}{8}\right)^2 = (16r_i^{re}-6)/8, & \text{for } r_i^{re} < -\frac{3}{4} \end{cases}$$

$LLR(x_{i,1}) =$ $$\begin{cases} \left(r_i^{re}-\frac{7}{8}\right)^2 - \left(r_i^{re}-\frac{3}{8}\right)^2 = (-8r_i^{re}+5)/8, & \text{for } r_i^{re} \geq \frac{3}{4} \\ \left(r_i^{re}-\frac{5}{8}\right)^2 - \left(r_i^{re}-\frac{3}{8}\right)^2 = (-4r_i^{re}+2)/8, & \text{for } \frac{2}{4} \leq r_i^{re} < \frac{3}{4} \\ \left(r_i^{re}-\frac{5}{8}\right)^2 - \left(r_i^{re}-\frac{3}{8}\right)^2 = (-4r_i^{re}+2)/8, & \text{for } \frac{1}{4} \leq r_i^{re} < \frac{2}{4} \\ \left(r_i^{re}-\frac{5}{8}\right)^2 - \left(r_i^{re}-\frac{1}{8}\right)^2 = (-8r_i^{re}+3)/8, & \text{for } 0 \leq r_i^{re} < \frac{1}{4} \\ \left(r_i^{re}+\frac{5}{8}\right)^2 - \left(r_i^{re}+\frac{1}{8}\right)^2 = (8r_i^{re}+3)/8, & \text{for } -\frac{1}{4} \leq r_i^{re} < 0 \\ \left(r_i^{re}+\frac{5}{8}\right)^2 - \left(r_i^{re}+\frac{3}{8}\right)^2 = (4r_i^{re}+2)/8, & \text{for } -\frac{2}{4} \leq r_i^{re} < -\frac{1}{4} \\ \left(r_i^{re}+\frac{5}{8}\right)^2 - \left(r_i^{re}+\frac{3}{8}\right)^2 = (4r_i^{re}+2)/8, & \text{for } -\frac{3}{4} \leq r_i^{re} < -\frac{2}{4} \\ \left(r_i^{re}+\frac{7}{8}\right)^2 - \left(r_i^{re}+\frac{3}{8}\right)^2 = (8r_i^{re}+5)/8, & \text{for } r_i^{re} < -\frac{3}{4} \end{cases}$$

$LLR(x_{i,2}) =$ $$\begin{cases} \left(r_i^{re}-\frac{7}{8}\right)^2 - \left(r_i^{re}-\frac{5}{8}\right)^2 = (-4r_i^{re}+3)/8, & \text{for } r_i^{re} \geq \frac{3}{4} \\ \left(r_i^{re}-\frac{7}{8}\right)^2 - \left(r_i^{re}-\frac{5}{8}\right)^2 = (-4r_i^{re}+3)/8, & \text{for } \frac{2}{4} \leq r_i^{re} < \frac{3}{4} \\ \left(r_i^{re}-\frac{1}{8}\right)^2 - \left(r_i^{re}-\frac{3}{8}\right)^2 = (4r_i^{re}-1)/8, & \text{for } \frac{1}{4} \leq r_i^{re} < \frac{2}{4} \\ \left(r_i^{re}-\frac{1}{8}\right)^2 - \left(r_i^{re}-\frac{3}{8}\right)^2 = (4r_i^{re}-1)/8, & \text{for } 0 \leq r_i^{re} < \frac{1}{4} \\ \left(r_i^{re}+\frac{1}{8}\right)^2 - \left(r_i^{re}+\frac{3}{8}\right)^2 = (-4r_i^{re}-1)/8, & \text{for } -\frac{1}{4} \leq r_i^{re} < 0 \\ \left(r_i^{re}+\frac{1}{8}\right)^2 - \left(r_i^{re}+\frac{3}{8}\right)^2 = (-4r_i^{re}-1)/8, & \text{for } -\frac{2}{4} \leq r_i^{re} < -\frac{1}{4} \\ \left(r_i^{re}+\frac{7}{8}\right)^2 - \left(r_i^{re}+\frac{5}{8}\right)^2 = (4r_i^{re}+3)/8, & \text{for } -\frac{3}{4} \leq r_i^{re} < -\frac{2}{4} \\ \left(r_i^{re}+\frac{7}{8}\right)^2 - \left(r_i^{re}+\frac{5}{8}\right)^2 = (4r_i^{re}+3)/8, & \text{for } r_i^{re} < -\frac{3}{4} \end{cases}$$

$LLR(x_{i,3})$ can be calculated in the same way as $LLR(x_{i,0})$, $LLR(x_{i,4})$ can be calculated in the same way as $LLR(x_{i,1})$, and $LLR(x_{i,5})$ can be calculated in the same way as $LLR(x_{i,2})$, wherein an input value $r_i^{re}$ is replaced by $r_i^{im}$.

Figure 5:
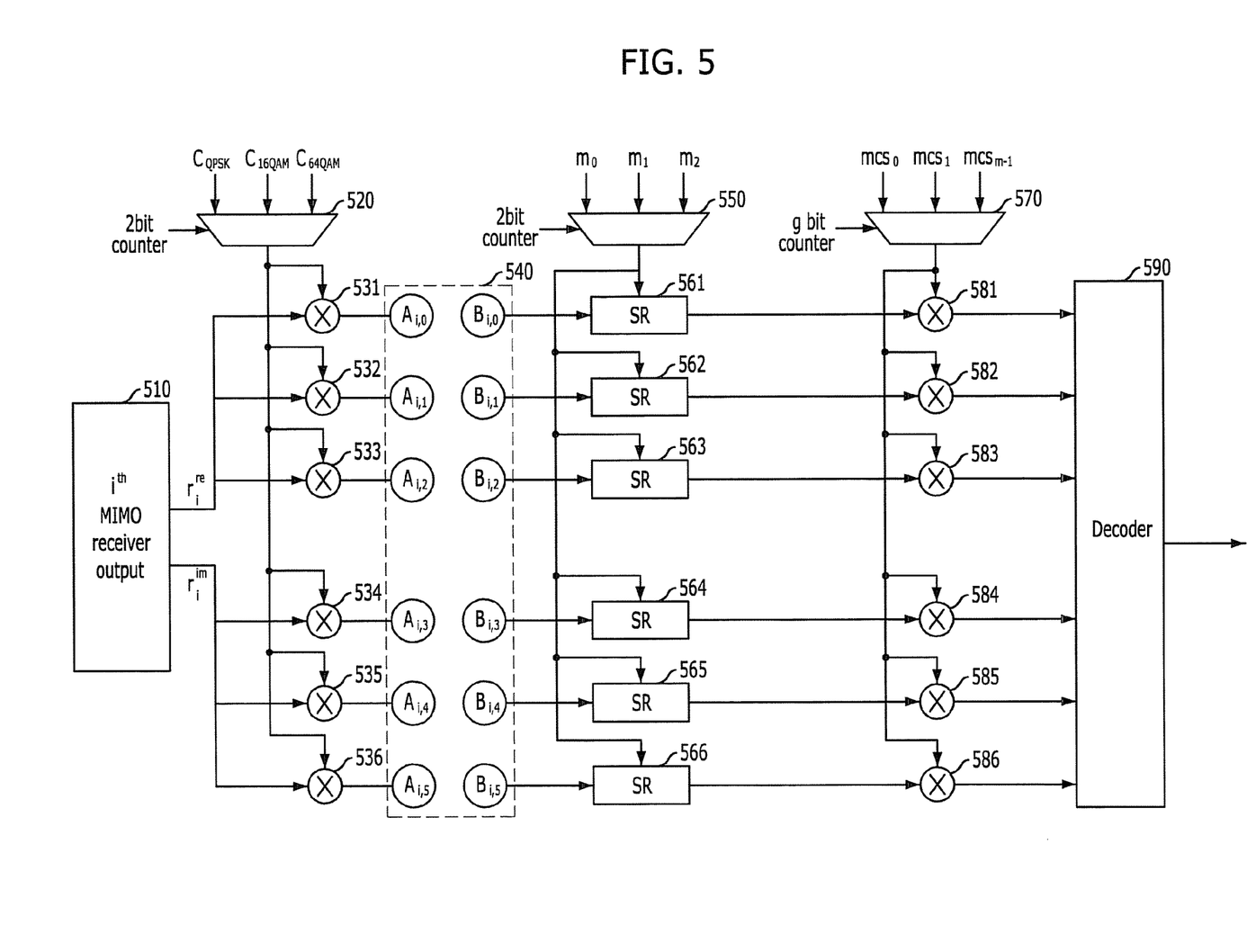
FIG. 5 is a diagram illustrating a hardware structure for calculation of an LLR in 64 QAM in accordance with an embodiment of the present invention.

FIG. 5 is a diagram illustrating a hardware structure for calculation of an LLR in 64 QAM in accordance with an embodiment of the present invention.

Referring to FIG. 5, the hardware structure includes an MIMO receiver 510 configured to provide the output of the $I^{th}$ MIMO receiver, a first multiplexer 520, first multipliers 531 to 533 and 544 to 546, a second multiplexer 550, shift registers 561 and 566, a third multiplexer 570, second multipliers 581 to 586, and a decoder 590, which are configured to determine the normalization value of Table 2 by determining a modulation scheme.

The MIMO receiver 510 receives a signal and provides the $i^{th}$ MIMO receiver output comprised of $r_i^{re}$ and $r_i^{im}$. The first multiplexer 520 uses a 2-bit counter to select a normalization value according to each modulation scheme (e.g., QPSK, 16 QAM and 64 QAM) of Equation (8). The first multipliers 531 to 533 and 544 to 546 multiply $r_i^{re}$ and $r_i^{im}$, received from the MIMO receiver 510, by the normalization value selected by the first multiplexer 520. An LLR extractor 540 detects a period for $r_i^{re}$ and $r_i^{im}$ in Equations (13), (14) and (15), selects an LLR calculation method for the detected period, calculates the output value received from the first multipliers 531 to 536, and transfers the results to the shift registers 561 to 566. For example, in the case of 64 QAM, 8 periods are present. An operation method of the LLR extractor 540 will be described later in detail with reference to FIG. 6. The second multiplexer 550 selects a shift value for each modulation scheme from the denominator term of the right term. The shift value may be configured as Table 3. The shift registers 561 and 566 shift the output value of the LLR extractor 540 by the number of bits selected by the second multiplexer 550.

TABLE 3

| Modulation Scheme | Denominator Term Value | Number of Shift Bits |
|---|---|---|
| QPSK | 1 | 0 |
| 16QAM | 2 | 1 |
| 64QAM | 8 | 3 |

In the LLR calculation process of Equation (9), a value scaling with a noise power $\sigma^2$ requires a multiplication operation. In order to avoid such a multiplication operation, the present invention calculates a noise power from a required SNR satisfying the error performance. For data transmission by the transmitter, the third multiplexer 570 selects a value corresponding to a noise power corresponding to a predetermined MCS (Modulation and Coding Scheme), and transfers the selected value to the second multipliers 581 to 586. The noise power value corresponding to the MCS can be configured as Table 4, which may vary depending on the system characteristics and the modulation schemes.

TABLE 4

| MCS Number | Modulation | Channel Coding | Required SNR (dB) Satisfying Packet Error 1% | mcsj Input Value |
|---|---|---|---|---|
| 0 | QPSK | 1/3 | 5 | 65 |
| 1 | QPSK | 1/2 | 8 | 184 |
| 2 | QPSK | 2/3 | 10 | 252 |
| 3 | QPSK | 3/4 | 13 | 318 |
| 4 | 16QAM | 2/3 | 15 | 451 |
| 5 | 16QAM | 3/4 | 17 | 632 |

TABLE 4-continued

| MCS Number | Modulation | Channel Coding | Required SNR (dB) Satisfying Packet Error 1% | mcsj Input Value |
|---|---|---|---|---|
| 6 | 64QAM | 3/4 | 21 | 864 |
| 7 | 64QAM | 5/6 | 25 | 1047 |

If there are 8 MCSs as shown in Table 4, a transmitter of a general wireless communication system transmits data according to a predetermined MCS, and transmits the corresponding information through a control channel. A receiver demodulates the control channel to detect the MCS of data region, and uses the control channel information to select a predetermined mcsj (noise power) value from a required SNR of the corresponding MCS. In the case of MCS 3, QPSK is used as a modulation scheme, and 2/3 is used as a cannel coding value. Accordingly, a required SNR value satisfying a packet error 1% is 10 dB, and an mcsj (noise power) value inputted into the third multiplexer 570 is 252.

The second multipliers 581 and 586 multiply the output value of the shift registers 561 to 566 and the output value of the third multiplexer 570, scale the same according to the number of bits of the decoder, and transfer the results to the decoder. The decoder 590 decodes the output of the second multiplier.

Figure 6:
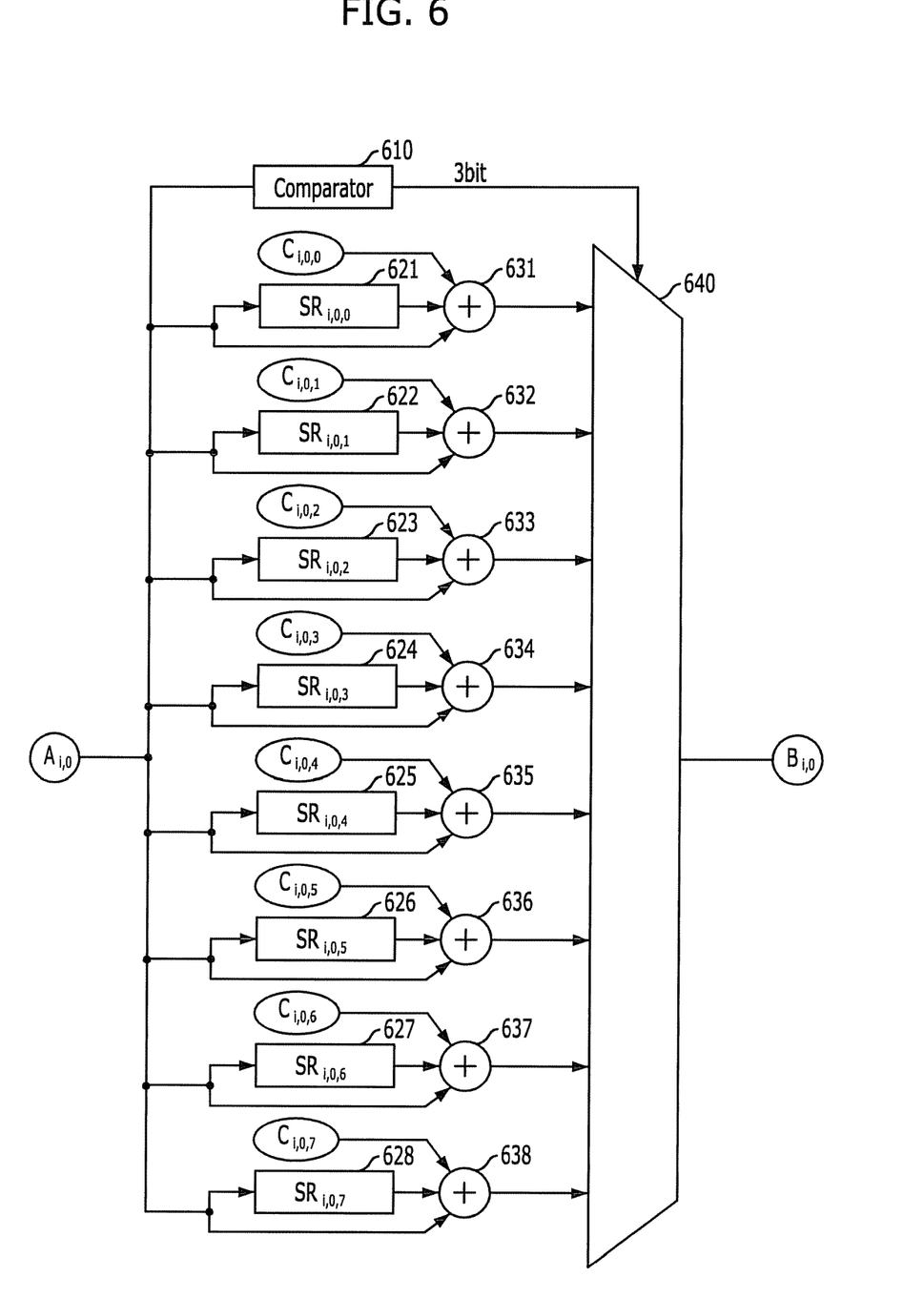
FIG. 6 is a diagram illustrating the structure of a log-sum scheme including a shift register and an adder.

FIG. 6 is a diagram illustrating the structure of a log-sum scheme including a shift register and an adder.

FIG. 6 illustrates an internal structure of the LLR extractor 540 of FIG. 5, and illustrates the structure of a log-sum scheme for an LLR value of the $0^{th}$ bit of the $i^{th}$ MIMO receiver output value in the numerator term of Equation 915).

The comparator 610 determines a period corresponding to an input signal received from the first multipliers 531 to 536 of FIG. 5. The shift registers 621 to 628 calculates an LLR value by applying an LLR calculation method of the numerator term of Equation (15) in the period determined by the comparator 610. In $SR_{i,o,j}$, i denotes the $i^{th}$ MIMO output, '0' denotes the $0^{th}$ bit, and j denotes an operation equation of 8 periods for operating the respective bits as shown in Equation (15). For example, in the case of the second line (12r−3)/8 in Equation (15), because a $C_{i,o,j}$ value is ((8r+4r)−3)/8, it can be expressed as (r+r/2−3/8). Herein, a $C_{i,o,j}$ value is 3/8. That is, the $C_{i,o,j}$ value corresponds to a constant value, not a variable including r.

Although the multiplier sharing structure has been exemplified above, the present invention may be applicable to more sharing structures. Also, the above LLR calculation process of the present invention may be applicable not only 64 QAM but also to other modulation schemes such as QPSK, 16 QAM, and 128 QAM.

As described above, the use of the receiving apparatus with low complexity in accordance with the present invention makes it possible to reduce the hardware complexity and the amount of computation and provide high extendibility.

While the present invention has been described with respect to the specific embodiments, it will be apparent to those skilled in the art that various changes and modifications may be made without departing from the spirit and scope of the invention as defined in the following claims.

What is claimed is:

1. An apparatus for calculating a log likelihood ratio (LLR) inputted from a linear receiver into a decoder in a wireless communication system using a multi-input multi-output (MIMO) scheme, the apparatus comprising:

an MIMO receiver configured to output MIMO signals, which are inputted respectively from transmission (TX) antennas into reception (RX) antennas, in such a way to divide the MIMO signals into imaginary components and real components on an RX antenna basis;

a first multiplexer configured to select a predetermined normalization value corresponding to each modulation scheme;

a first multiplier configured to multiply each of the output signals of the MIMO receiver by the normalization value of the first multiplexer; and an LLR extractor configured to calculate an LLR value for each of the outputs of the first multiplier by using a normalization value of a constellation corresponding to the modulation scheme of a received signal.

2. The apparatus of claim 1, further comprising:

a second multiplexer configured to output one of the shift values determined corresponding to the respective modulation schemes; and a shift register configured to shift each of the outputs of the LLR extractor by the shift value, outputted from the second multiplexer, prior to output.

3. The apparatus of claim 2, further comprising:

a third multiplexer configured to provide a noise power level for a signal-to-noise ratio (SNR) required to satisfy a predetermined performance for each modulation/coding scheme; and a second multiplier configured to multiply each of the outputs of the shift register by the noise power level.

4. The apparatus of claim 1, wherein the LLR extractor comprises:

a comparator configured to determine a period corresponding to an input signal according to the input signal received from the first multiplier; and a shift register configured to calculate an LLR value by a predetermined LLR calculation scheme of the determined period, determine a shift value according to the calculation result, and perform a shift operation according to the shift value.

5. A method for calculating a log likelihood ratio (LLR) inputted from a linear receiver into a decoder in a wireless communication system using a multi-input multi-output (MIMO) scheme, the method comprising:

outputting MIMO signals, which are inputted respectively from transmission (TX) antennas into reception (RX) antennas, in such a way to divide the MIMO signals into imaginary components and real components on an RX antenna basis;

multiplying each of the output signals divided into the imaginary and real components by a predetermined normalization value corresponding to each modulation scheme; and calculating an LLR value for each of the multiplication result values by using a normalization value of a constellation corresponding to the modulation scheme of a received signal.

6. The method of claim 5, further comprising:

shifting each of the calculated LLR values by a shift value, determined corresponding to each modulation scheme of the received signal, prior to output.

7. The method of claim 6, further comprising:

multiplying each of the shifted output values by a noise power level for a signal-to-noise ratio (SNR) required to satisfy a predetermined performance for each modulation/coding scheme.

8. The method of claim 6, wherein the shift value determined corresponding to each modulation scheme is determined as the following table.

| Modulation Scheme | Denominator Term Value | Number of Shift Bits |
|---|---|---|
| QPSK | 1 | 0 |
| 16QAM | 2 | 1 |
| 64QAM | 8 | 3 |

9. The method of claim 7, wherein the noise power level is determined as the following table.

| MCS Number | Modulation | Channel Coding | Required SNR (dB) Satisfying Packet Error 1% | mcsj Input Value |
|---|---|---|---|---|
| 0 | QPSK | 1/3 | 5 | 65 |
| 1 | QPSK | 1/2 | 8 | 184 |
| 2 | QPSK | 2/3 | 10 | 252 |
| 3 | QPSK | 3/4 | 13 | 318 |
| 4 | 16QAM | 2/3 | 15 | 451 |
| 5 | 16QAM | 3/4 | 17 | 632 |
| 6 | 64QAM | 3/4 | 21 | 864 |
| 7 | 64QAM | 5/6 | 25 | 1047 |

10. The method of claim 5, wherein the predetermined normalization value corresponding to each modulation scheme is determined as the following table.

| Modulation Scheme | Scaling Value for Normalization |
|---|---|
| QPSK | 1/2 |
| 16QAM | 1/4 |
| 64QAM | 1/8 |

\* \* \* \* \*